United States Patent [19]
Perreault

[11] 3,794,142
[45] Feb. 26, 1974

[54] LUBRICATION SYSTEM FOR VARIABLE SPEED DRIVE PULLEY

[75] Inventor: Jules Perreault, Valcourt, Quebec, Canada

[73] Assignee: Bombardier Limited, Valcourt, Quebec, Canada

[22] Filed: June 29, 1972

[21] Appl. No.: 267,473

[52] U.S. Cl. ........ 184/6.5, 74/230.17 L, 123/196 R
[51] Int. Cl. ............................................. F01m 1/06
[58] Field of Search.. 184/6 R, 1 R, 6.5; 123/196 R, 123/196 CP; 74/230.17 E, 230.17 L, 230.17 F

[56] References Cited
UNITED STATES PATENTS
| | | | |
|---|---|---|---|
| 3,048,056 | 8/1962 | Wolfram | 74/230.17 E |
| 1,913,226 | 6/1933 | Adams | 74/230.17 L |
| 2,107,483 | 2/1938 | Knight | 74/230.17 L |

FOREIGN PATENTS OR APPLICATIONS
569,019  5/1945  Great Britain .............. 74/230.17 L Primary Examiner—Manuel A. Antonakas

[57] ABSTRACT

An automatic system is disclosed for lubricating a variable speed drive pulley of the type having two pulley sheaves axially mounted for rotation on the output end of a crankshaft of a two-cycle engine and wherein one sheave is free to move axially relative to the other. Heretofore, pulleys of this type required maintenance mantenance in order to ensure proper lubrication between the movable sheave and a pulley shaft connected to the output end of the crankshaft. The novel system comprises a conduit which extends through the crankshaft and which leads oil from the interior of the engine's crankcase to between the movable sheave and the output portion of the pulley shaft fixed to the crankshaft.

4 Claims, 1 Drawing Figure

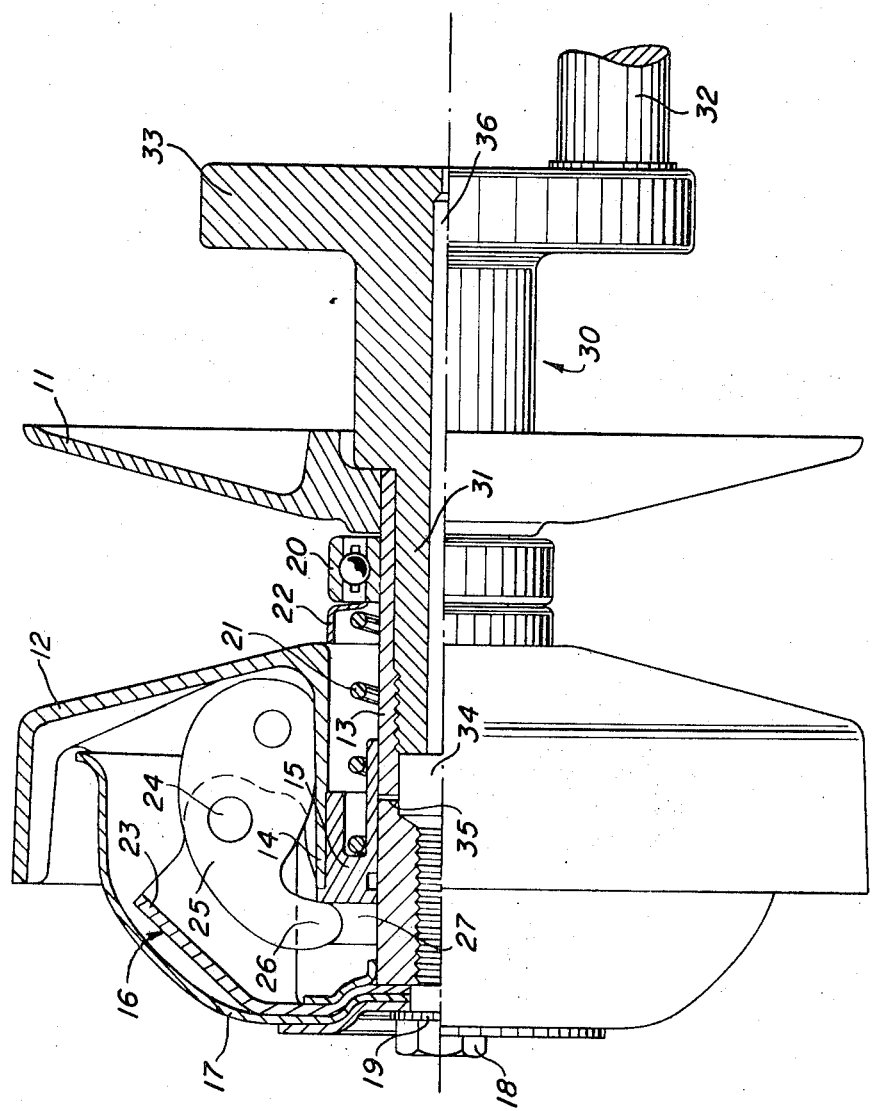

LUBRICATION SYSTEM FOR VARIABLE SPEED DRIVE PULLEY

BACKGROUND OF THE INVENTION

This invention relates to a system for automatically lubricating a variable speed drive pulley of the type having two pulley sheaves axially mounted for rotation of the output end of a crankshaft of a two-cycle engine and wherein one sheave is free to move axially relative to the other.

Centrifugal drive pulleys incorporating an automatic variable pitch drive pulley are commonly used in the drive trains of vehicles such as snowmobiles. Because one sheave of the pulley is axially displaceable relative to the other sheave along a pulley shaft, there is a need to ensure that the bearing surfaces between the displaceable sheave and the pulley shaft are properly lubricated. This is true whether or not the displaceable sheave is mounted for axial movement along a smooth cylindrical pulley shaft or a shaft provided with splines or other locking key-way systems. Improper lubrication between the displaceable sheave and the pulley shaft can result in the production of "flats" or "steps" along the length of the shaft. Imperfections of this nature interrupt an otherwise smooth axial displacement of the movable sheave towards the fixed sheave as the speed of rotation of the pulley increases. This can produce a jarring or chattering effect in the drive train as the displaceable sheave moves from one step to another. Further, flats or steps so created tend to lock or constrict the axial movement of the sheave thereby positioning it in a location in which it would not normally be located for a given r.p.m. The interruptive action experienced through a lack of proper lubrication can cause overloading throughout the drive train and excessive wear on drive train parts other than the pulley itself. In extreme cases, excess play can develop between the displaceable sheave and the pulley shaft necessitating replacement of these two components or the complete pulley. Attempts have been made to ensure adequate lubrication of centrifugal pulleys but such attempts always necessitated a maintenance program with no assurance that it would be carried out.

SUMMARY OF THE INVENTION

In accordance with a preferred embodiment of this invention, an automatic lubrication system for centrifugal pulleys of the above description has been devised whereby the requirement of grease packing and periodic lubrication of the pulley shaft and its governor fly-weights incorporated in the pulley is avoided.

Basically, the crankshaft of a two-cycle engine is provided with conduit means extending from its output end exterior of the engine through to the crankcase of the engine. The pulley shaft, which is connected to the output end of the crankshaft, is also provided with means communicating with the conduit and, in the proximity of the displaceable sheave, with one or more apertures extending from the interior of the pulley shaft to its exterior bearing surface.

It is to be understood that, in this novel system, the fuel used in the two-cycle engine is one of the gasoline-oil variety. In conventional two-cycle engines of this type, during an upward piston stroke, the engine crank-case is charged with the air-fuel mixture. As the piston moves downwardly, this charge is compressed and delivered to the combustion chamber for compression upon the upward return of the piston. The conduit means extending from the crankcase to the bearing surfaces of the movable sheave and pulley shaft permits a very small but nonetheless significant amount of the charge mixture to bypass the normal combustion route during compression in the crankcase, so that a thin film of oil is deposited between the bearing surfaces of the pulley shaft and the displaceable sheave. This secondary routing of the oil-containing combustion mixture to the bearing surfaces has been found adequate for automatically maintaining a constant lubrication of the bearing surfaces. Although a small proportion of the combustion charge is allowed to escape for the purpose of lubrication, the loss experienced is so slight that the resultant loss in engine efficiency is hardly noticeable.

It has also been found that by selective positioning of the apertures in the hollow pulley shaft which communicate with the bearing surface exterior of the shaft, one is able to lubricate the pivotal connections of the fly-weights of the governor assembly in a centrifugally actuated variable drive pulley. This is also true with respect to the bearing surfaces existing between the fingers of the fly-weights and the hub of the axially displaceable sheave.

BRIEF DESCRIPTION OF THE DRAWINGS

The invention can be more fully understood from the following detailed description of a preferred embodiment, with reference to the accompanying drawing, which is a side view of a typical centrifugally actuated variable drive pulley assembly, the upper portion of which is shown in cross-section, the assembly being connected to the output end of the crankshaft of a two-cycle engine.

As illustrated, a fixed inner sheave 11 is mounted on one end of pulley shaft 13 for rotation therewith. Pulley shaft 13, which in this case has a smooth cylindrical outer surface, also has coaxially mounted thereon an axially movable outer sheave 12. Sheaves 11 and 12 have opposed tapering surfaces which co-act to form a V-shaped groove. As displaceable sheave 12 moves towards inner sheave 11, a pulley of variable pitch is created. Movable sheave 12 is provided with a hub portion 14 which extends away from inner sheave 11 and includes a bearing sleeve member 15 slidable along the outer surface of pulley shaft 13.

A centrifugal governor assembly 16 is mounted on pulley shaft 13, together with bell-housing 17, by means of bolt 18 and washer 19. Once bolt 18 is tightly threaded into the end of shaft 13 it serves to lock and hold the bell-housing 17 and governor assembly 16 in fixed position on shaft 13 so that they are all rotatable as a unit together with inner sheave 11. Drive belt bearing 20 is positioned on pulley shaft 13 adjacent inner sheave 11 and serves to permit free rotation of the assembly relative to the drive belt (not shown) positioned between the sheaves when the engine to which the assembly is attached is operating at a low r.p.m. Bearing 20 can also serve as a supporting member for displaceable sheave 12 when sheave 12 is axially displaced to a position adjacent fixed sheave 11. Spring seat 22 is located on pulley shaft 13 adjacent bearing 20 and the side thereof opposite inner sheave 11. Spring 21, coaxial with pulley shaft 13, extends from the spring seat 22 to bearing sleeve member 15 of hub portion 14 of outer sheave 12. Spring 21 serves to bias the two sheaves 11 and 12 to maximum spaced apart condition when the pulley is stationary or rotating at a low r.p.m., which is the position indicated in the drawing.

The governor assembly, generally indicated at 16, preferably includes a spider 23 constructed in a manner similar to that disclosed in applicant's copending Canadian Patent application filed Nov. 24, 1971 and Ser. No. 128,477 and entitled "CLUTCH." Included in the governor assembly are fly-weights 25 (only one being shown in the drawing) each of which is pivotally connected to the spider 23 by means of pin 24. Fly-weights 25 are radially and symmetrically arranged on the spider 23 for the purpose of keeping the pulley assembly in balance during rotation. Each fly-weight 25 includes a finger portion 26. In the assembly illustrated, which is of the splineless type, fingers 26 each engage a notch 27 provided in hub portion 14 of outer sheave 12. Inasmuch as inner sheave 11, governor 16 and bell-housing 17 are rotatable as a unit with pulley shaft 13, reception of fingers 26 in notches 27 provides a positive connection between governor 16 and outer sheave 12 so that sheave 12 also rotates, although, of course, it may also move axially along pulley shaft 13.

As the assembly spins about its axis, the portions of fly-weights 25 to the right of their pin connections 24 to spider 23 are flung outwardly relative to pulley shaft 13, thereby forcing fingers 26 to urge displaceable sheave 12 along shaft 13 towards fixed inner sheave 11.

As will be seen, pulley shaft 13 is threadedly connected to the output end 31 of an engine crankshaft 30. Not illustrated for ease of understanding but positioned intermediate fixed sheave 11 and crankshaft blade 33 of crankshaft 30 is the wall of the engine crankcase through which the crankshaft extends and on which it is supported by suitable bearing means and oil seals. A connecting rod (not shown) is connected to bearing 32 of crankshaft 30. Conduit 36, which is preferably coaxial with the crankshaft, extends through the shaft from its output end 31 to the interior side of crankshaft blade 33 located within the engine crankcase. Although pulley shaft 13 is hollow, its end remote from the engine is closed by bolt 18. Chamber 34 within hollow pulley shaft 13 is defined between the end of bolt 18 and the end of the crankshaft. Extending radially outwardly from this chamber through the wall of shaft 13 are one or more apertures 35. These apertures preferably are positioned in such a manner that they are substantially centrally located relative to the bearing sleeve member 15 of hub portion 14 when displaceable sheave 12 is at the position illustrated in the drawing.

When the engine is in operation, the fuel mixture containing oil is charged in the crankcase during the upward stroke of the engine piston. As the piston returns to its down position, this mixture is compressed and a small portion of it is transmitted along the conduit 36 to chamber 34 and thence through apertures 35. Oil escaping through apertures 35 is then distributed as a film along the bearing surfaces of reciprocating outer sheave 12 and pulley shaft 13. Usuing normal tolerances between the bearing sleeve member 15 of the displaceable sheave 12 and pulley shaft 13, it has been found that two to three radially extending apertures having a diameter of three thirty-seconds inch provide adequate lubrication at the bearing interface. If the bores of conduit 36 and chamber 34 are greater in diameter than apertures 35, the flow of the oil-containing mixture is simply controlled by the number or size of apertures 35.

In the lubrication system illustrated, when outer sheave 12 moves to its closest position to fixed sheave 11, which is the case when the assembly is spinning at high r.p.m., apertures 35 still remain covered by bearing sleeve member 15 thereby still restricting the throughput of gasoline-oil mixture through apertures 35. The flow-rate of the mixture is sufficient, however, to ensure an application of oil film in the proximity of the pin connections of fly-weights 25 to spider 23 and bearing surfaces of fingers 26 on notches 27. The diameter of apertures 35 should be precisely calibrated in order to ensure that although the shaft is adequately lubricated, not too much of the gasoline-oil mixture is free to escape in the fly-weight area. Excessive oil on sheaves 11 and 12 can result in slippage between the sheaves and the drive belt therebetween which will cause the drive belt to burn.

What I claim as my invention is:

1. In a variable speed drive pulley of the type having two sheaves axially mounted for rotation on the output portion of a two-cycle engine crankshaft and wherein one of said sheaves is fixed and the other of said sheaves is axially displaceable relative thereto, the improvement comprising a lubrication system having conduit means which extends through said crankshaft and communicates the interior of the engine's crankcase with the bearing interface between said axially displaceable sheave and said output portion of the crankshaft.

2. A lubrication system as claimed in claim 1, wherein said fixed sheave is positioned intermediate the engine and said axially displaceable sheave and wherein said sheaves are mounted for rotation on a pulley shaft, said pulley shaft being coupled to said end portion of said crankshaft.

3. A lubrication system as claimed in claim 2, wherein said conduit means includes a bore extending axially within said crankshaft, a chamber within said pulley shaft and at least one radially extending aperture in the wall of said pulley shaft.

4. A lubrication system as claimed in claim 3 having at least two of said apertures.

* * * * *